G. Mein,

Banjo,

No. 57,540.   Patented Aug. 28, 1866.

Witnesses:

Inventor:
Geo. Mein
Per [signature]
Attorneys

UNITED STATES PATENT OFFICE.

GEORGE MEIN, OF WILLIAMSBURG, NEW YORK.

IMPROVEMENT IN BANJOS.

Specification forming part of Letters Patent No. 57,540, dated August 28, 1866.

*To all whom it may concern:*

Be it known that I, GEORGE MEIN, of Williamsburg, Kings county, State of New York, have invented a new and useful Improvement in Banjos; and I do hereby declare that the following is a full, clear, and exact description thereof, which will enable others skilled in the art to make and use the same, reference being had to the accompanying drawings, forming part of this specification, in which—

Figure 1:
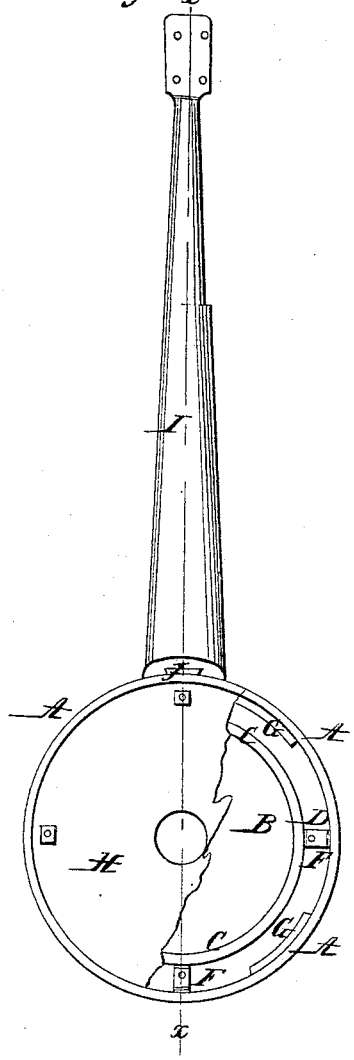
Figure 2:
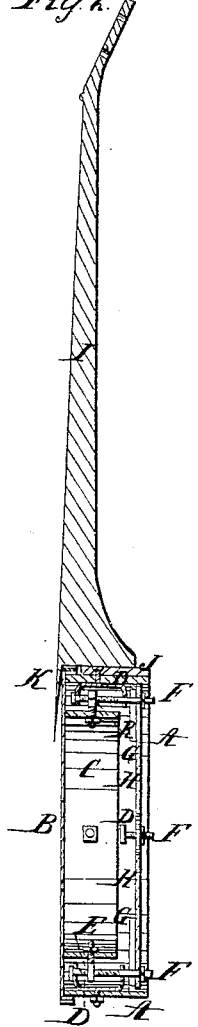

Figure 1 is a back view of my improved banjo, a part of the sounding-board being broken away to show the construction. Fig. 2 is a longitudinal section of the same, taken through the line $x\ x$, Fig. 1.

Similar letters of reference indicate like parts.

My invention has for its object to furnish an improved banjo so constructed that the head can be readily strained; and it consists, first, of the combination of an interior rim with the exterior rim and with the head; and, second, in the manner of attaching the stem to the rim, as hereinafter more fully described.

A is the outer or ordinary rim, which is made in the usual manner, and to which the head B is attached.

C is the interior rim, which is made of such a size as to set within the rim A, leaving a space between the rims all around, as shown in Fig. 1.

To the inner side of the rim A are attached four or more bars, D, by screws passing through the outer rim and screwing into the said bars D. The ends of these bars are bent over, so as to form ears, as shown in the drawings. These ends or ears are perforated for the reception of the screws by which the inner rim is operated.

To the outer side of the rim C are attached ears E, which are perforated and have screw-threads cut in the holes thus formed.

F are screws passing through the ears thus formed. The lower ends of these screws are pivoted or swiveled to the ear of the bar D nearest to the head B. If these screws are turned forward the rim C is lifted away from the head B. By turning the screws F backward the rim C is forced against the head B, straining it to any degree of tightness that may be necessary.

G is a ledge attached to the inner side of the rim A for the sounding-board H to rest upon, as in the ordinary banjo.

In the end of the stem I, which is attached to the rim A, is formed a dovetailed groove, and to the outer side of the rim A is securely attached a piece, J, which fits into the groove in the end of the stem. By this manner of attaching the stem I to the rim A, I am able to extend the finger-board K farther over the head than could otherwise be done, so that the strings may be fingered farther down.

I claim as new and desire to secure by Letters Patent—

1. The interior rim, C, in combination with the exterior rim, A, and with the head B of the banjo, substantially as described, and for the purpose set forth.

2. The manner of attaching the stem I to the rim A with a dovetailed groove and strip, substantially as herein described, and for the purpose set forth.

GEORGE MEIN.

Witnesses:
M. M. LIVINGSTON,
JAMES T. GRAHAM.